US007284914B2

(12) United States Patent
Marazzi et al.

(10) Patent No.: US 7,284,914 B2
(45) Date of Patent: Oct. 23, 2007

(54) STRUCTURES FOR SMALL FORM FACTOR LINBO3 OPTICAL MODULATOR

(75) Inventors: Marco Marazzi, San Donato (IT); Marcello Tienforti, San Donato (IT); Francesco Schiattone, San Donato (IT)

(73) Assignee: Avanex Corporation, Freemont, CA (US)

( * ) Notice: Subject to any disclaimer, the term of this patent is extended or adjusted under 35 U.S.C. 154(b) by 78 days.

(21) Appl. No.: 10/866,949

(22) Filed: Jun. 12, 2004

(65) Prior Publication Data

US 2005/0276533 A1 Dec. 15, 2005

(51) Int. Cl.
*G02B 6/36* (2006.01)

(52) U.S. Cl. .......................................................... 385/92

(58) Field of Classification Search ..................... None
See application file for complete search history.

(56) References Cited

U.S. PATENT DOCUMENTS 4,094,579 A * 6/1978 McMahon et al. ............ 385/49
4,445,751 A * 5/1984 Divens et al. ................ 385/43
4,772,086 A * 9/1988 Bellerby et al. .............. 385/89
4,836,645 A * 6/1989 Lefevre et al. ............... 385/49
4,871,226 A * 10/1989 Courtney et al. ............. 385/14
4,948,219 A * 8/1990 Seino et al. .................. 385/95
4,994,134 A * 2/1991 Knecht et al. .............. 156/294
5,175,781 A * 12/1992 Hockaday et al. ............ 385/49
5,444,804 A * 8/1995 Yui et al. ....................... 385/49
5,664,043 A * 9/1997 Donaldson et al. .......... 385/138
5,784,513 A * 7/1998 Kuribayashi et al. ......... 385/88
6,128,927 A * 10/2000 Ahrens et al. ................ 65/392
2002/0122653 A1* 9/2002 Donaldson et al. .......... 385/138
2003/0095311 A1* 5/2003 Liu et al. .................... 359/135
2003/0138200 A1* 7/2003 Liu et al. ....................... 385/33

OTHER PUBLICATIONS

Data Sheet for EOSPACE Lithium Niobate 10 to 20 Gb/s Modulators, Sep. 2003 (www.absys-net.com/pdf/eospace/amok1.pdf).*

* cited by examiner

*Primary Examiner*—Rodney Bovernick
*Assistant Examiner*—Mike Stahl
(74) *Attorney, Agent, or Firm*—Patterson & Sheridan, LLP

(57) ABSTRACT

Small form factor package structures are disclosed for LiNbO3 optical modulator by reducing the package dimension for minimize the unused free space inside a modulator package. If a first aspect of the invention, the structure of the small form factor package for LiNbO3 optical modulator employs a metal round block having an inner part that is made of zirconia or glass like borosilicate BK7 or Pyrex and the outer part that is made with stainless steel or kovar. The inner and outer parts represent a two-pieces optical fiber assembly that are held together by a resin. In a second aspect of the invention, a surface of the lithium niobate chip is attached to a surface of the metal round block (or a glass block) that results in an angular positioning of the lithium niobate chip inside the optical package, which significantly reduces the mechanical stress induced by different polishing angle of the metal round block as well as the polishing angle of the lithium niobate chip.

20 Claims, 7 Drawing Sheets

340
Metal case fixed to the package wall

330
Stainless steel package with 2.7 deg submount

310
Lithium Niobate chip

320
Metal round blocks

STRUCTURES FOR SMALL FORM FACTOR LINBO3 OPTICAL MODULATOR

BACKGROUND INFORMATION

1. Field of the Invention

The invention relates generally to the field of optics, and more particularly to optical modulators and the dimension considerations for fitting into small form devices.

2. Description of Related Art

Market applications have expanded recently for analog and digital lithium niobate (LiNbO3) optical modulators in common cable television (CATV), telephone and data communications. This particular class of optical modulators is based on a waveguide version of Mach-Zehnder interferometer, in which interference is produced between phase coherent light waves that traveled over different path lengths. In the past, the Optical Component market has been mainly driven by performances. Each application generates specific reliability, manufacturing volume, and cost requirements. Reliability targets for these applications range from customer defined specifications to industrial standards with additional custom requirements. Cost variations are associated with device testing requirements and reliability expectations. A modular design and assembly approach has been used to accommodate all range of applications.

A recent industrial trend in optical packaging define the assembly of optical components in a smaller overall dimension. Accordingly, there is a need to design a structure for packaging a LiNbO3 optical modulators in a more compact space.

SUMMARY OF THE INVENTION

This invention discloses small form factor package structures for LiNbO3 optical modulator by reducing the package dimension for minimize the unused free space inside a modulator package. In a first aspect of the invention, the structure of the small form factor package for LiNbO3 optical modulator employs a pigtailing tip referred from hereinafter "metal round block (MRB)" having an inner part that is made of zirconia or glass like borosilicate BK7 or Pyrex and the outer part that is made with stainless steel or kovar. The inner and outer parts represent a two-pieces optical fiber assembly that are held together by a resin or inserted. In a second aspect of the invention, a surface of the lithium niobate chip is attached to a surface of the metal round block (or a glass block) that results in an angular positioning of the lithium niobate chip inside the optical package, which significantly reduces the mechanical stress induced by different polishing angle of the metal round block as well as the polishing angle of the lithium niobate chip.

A packaging structure for attaching a lithium niobate chip in a ultra small form factor optical modulator comprises a lithium niobate chip that has P degree polished; and a metal round block that is tilted at Q degree of angle; wherein the attachment of the lithium niobate chip to the metal round block produces a R degree by subtracting the Q degree from the P degree.

Other structures and methods are disclosed in the detailed description below. This summary does not purport to define the invention. The invention is defined by the claims.

BRIEF DESCRIPTION OF THE DRAWINGS

FIGS. 2A-2B depict pictorial diagrams illustrating the metal round block inside an optical packaged assembly with a rigid free flight in accordance with the present invention.

DETAILED DESCRIPTION OF PREFERRED EMBODIMENTS

Figure 1:
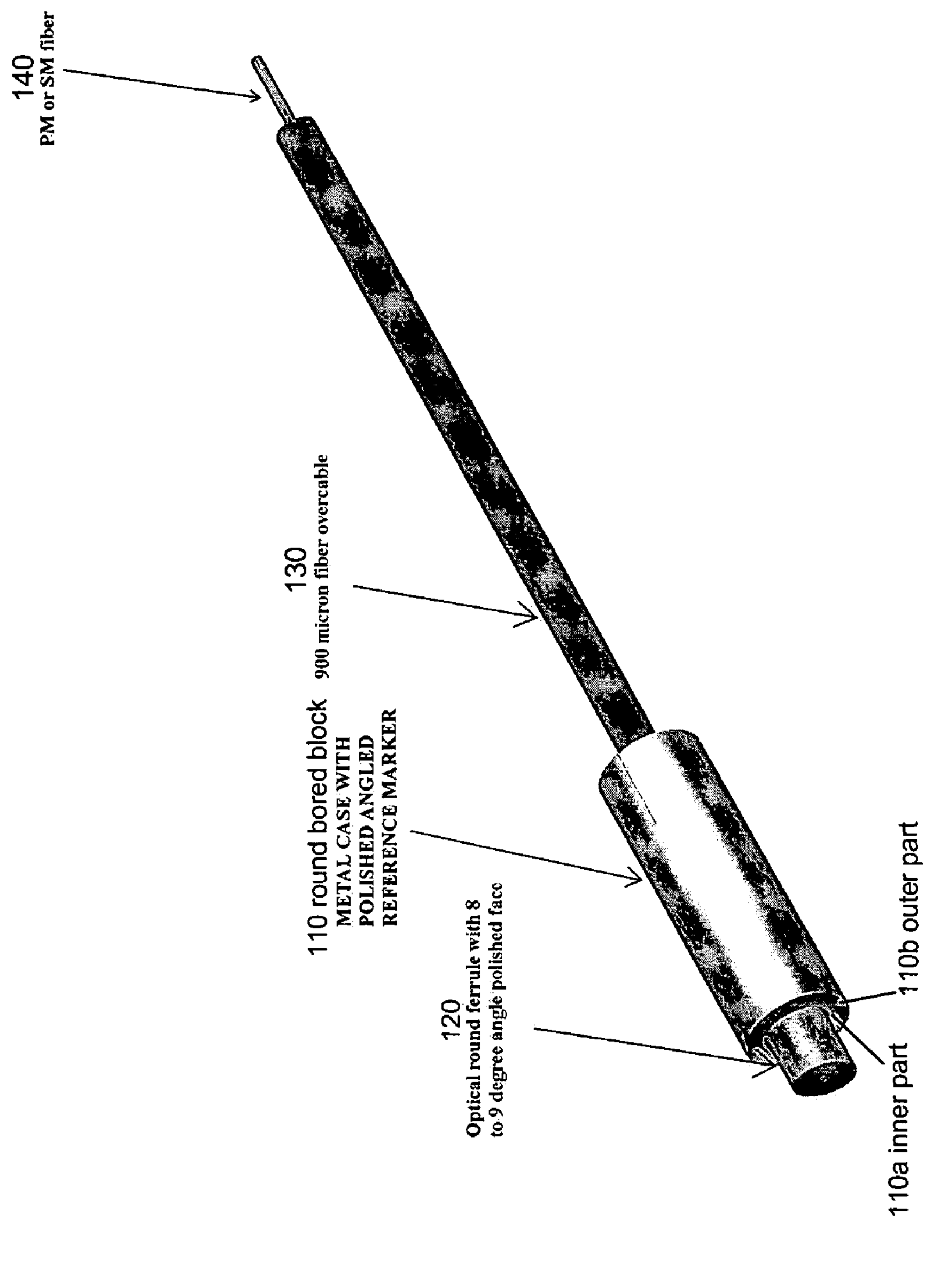
FIG. 1 depicts an architectural diagram illustrating a first embodiment of a ultra small form factor lithium niobate optical modulator that employs a metal round block for fiber optical assembly in accordance with the present invention.

Referring now to FIG. 1, there is shown an architectural diagram illustrating a first embodiment of a ultra small form factor lithium niobate optical modulator that employs a metal round block (MRB) 100 for fiber optical assembly. The metal round block 100 comprises a round bored block 110, an optical round ferrule 120, a fiber overcable 130, and a polarization maintaining (PM) or single mode (SM) fiber 140 or in other embodiment other types of fiber. The round bored block 110 comprises two elements: an inner part 110*a* that is made of zirconia or glass like boro silicate BK7 or Pyrex, and an outer part 110*b* that is made of metallic with stainless steel or kovar. The inner part 110*a* and the outer part 110*b* are fixed together by a resin or in other embodiment fixed together by insertion. The inner part 110*a*, i.e. the glass part, has a bore and bring inside the fiber and is coupled to a chip waveguide. Furthermore, the glass part 110*a* has a polished angled face (a typical angle is in the order of 8 to 9 degrees) for avoiding back-reflection. The metallic case houses the glass part and is fixed to the package wall by means of the thermal resin, UV resin or solder. The metal round block 100 can bring inside single mode or polarization maintaining (PM) fiber and also a standard 900 micron overcable 130 could be used to protect a fiber 140. Therefore, the round bored block or glass fiber block 110, the portion of the fiber 140 and the metal optical feedthrough 120 are assembled in one rugged part.

One of ordinary skill in the art should recognize that the round bored block 110 can be designed with a different geometric shape, such as square shape.

Figure 2A:
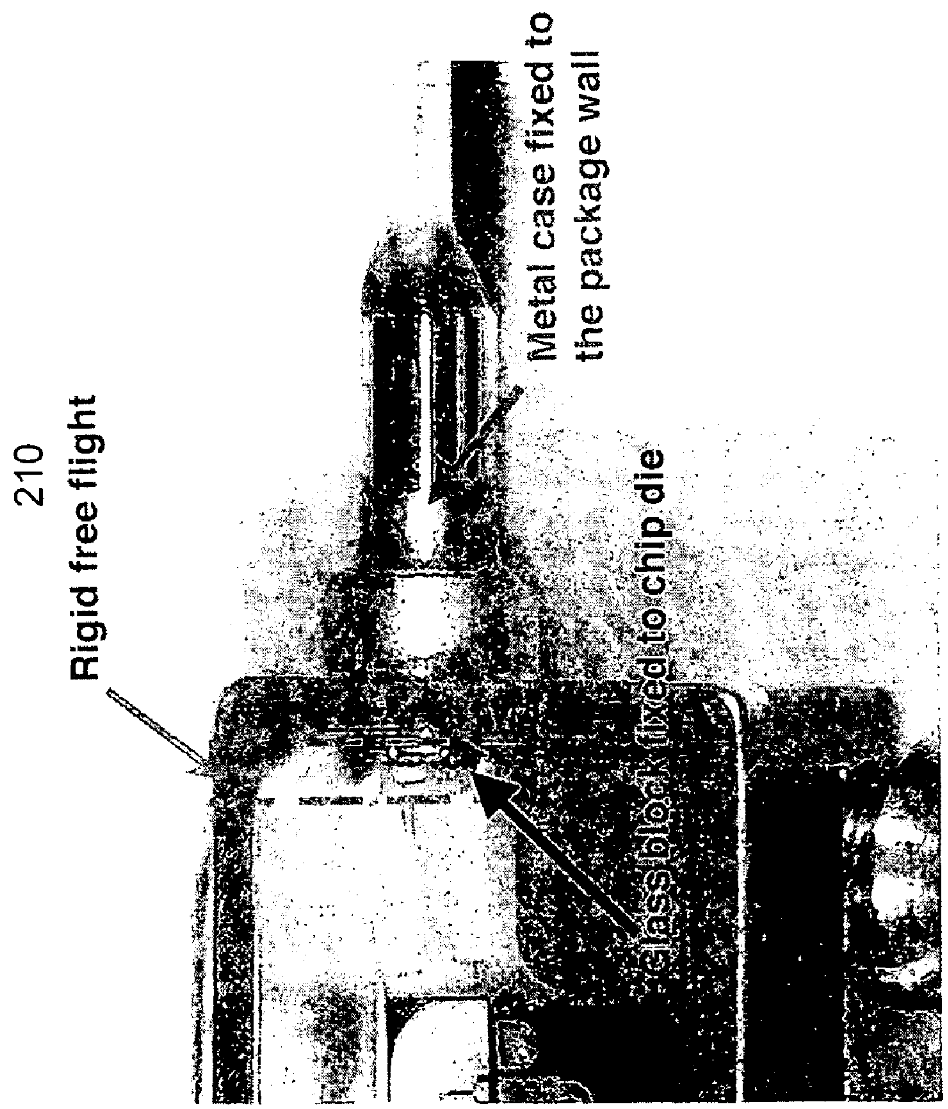
Figure 2B:
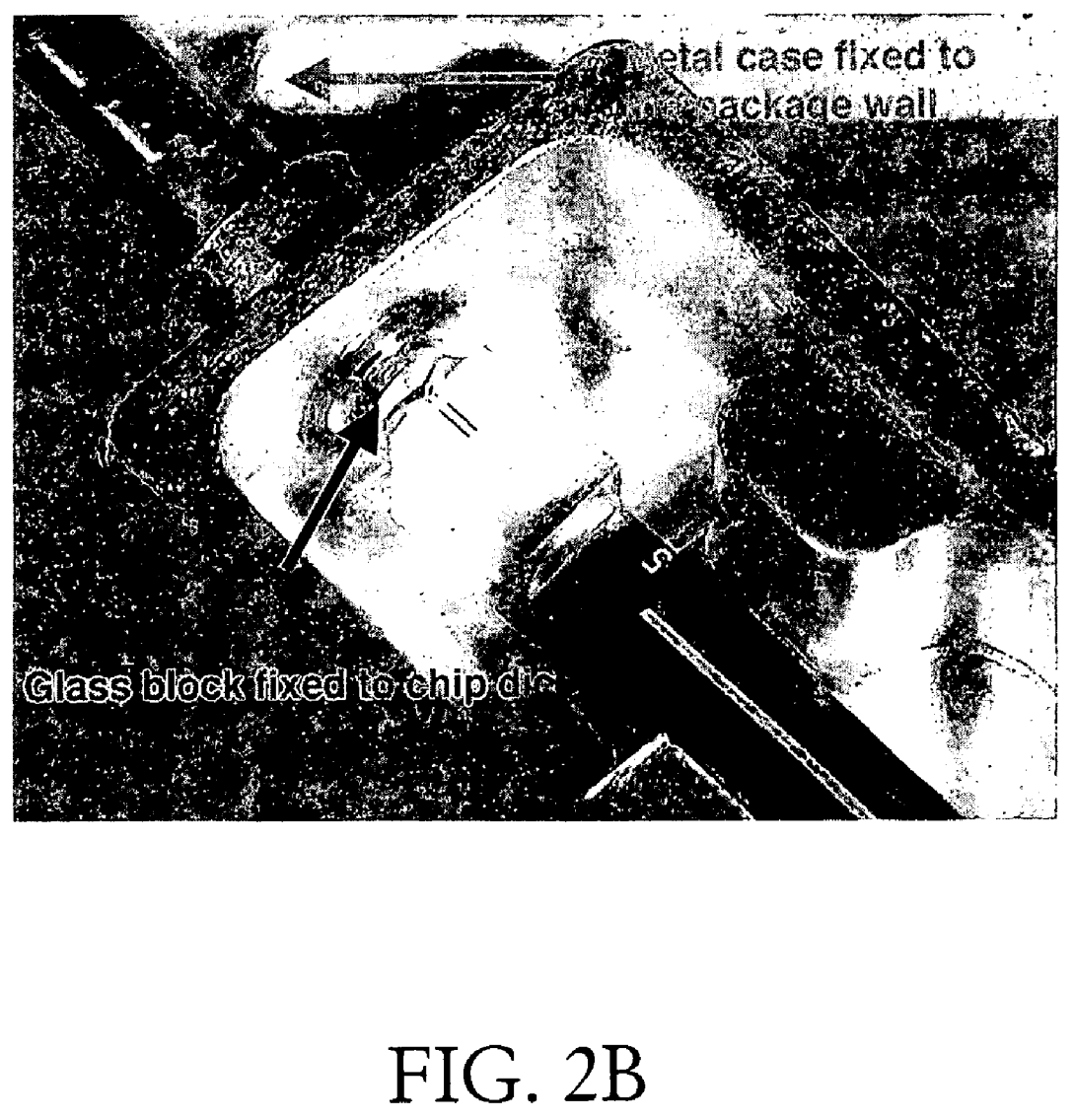

FIGS. 2A-2B depict pictorial diagrams illustrating the metal round block 200 inside an optical packaged assembly with a rigid free flight 210 in accordance with the present invention. The two-pieces optical fiber assembly in the present invention provides several advantages. First, this solution is compatible to a strong reduction of the free flight space, as shown with a rigid flight in FIG. 2A. With the MRB, the portion of the glass inside the package could be less to 0.5 mm for each side of the package. If the space occupied by the glass block and the fiber was about 7 mm, in this case the whole space will be up to 0.5 mm.

Secondly, this provides a low cost solution. As far as in a standard package, the price for a couple of glass block (PM and SM), a couple of metallic feedthrough and the cost of the manpower time to realize a couple of fiber assembly ranges are quite low. The optical packaging can be assembled in a hermetic or non-hermetic process.

Third, the solution could be in principle compatible with a fully hermetic package, so the cost saving can be more than 60%.

Fourth, concerning the performance, the glass inside the MRB has about the same thermal expansion coefficient of the LiNbO3 chip so the thermal dilation/contraction at chip level are matched. The metal case has the same thermal expansion coefficient of the package so in this case the thermal dilation/contraction at package level are matched. The resin inside the MRB has a higher thermal expansion coefficient than the other two parts in order to uncouple the different thermal dimensional modifications of the two parts. In an alternative embodiment, the two pieces are inserted together.

Fifth, the MRB can have a reference marker on the metallic case for easing the operation of pigtailing.

Sixth, the metal case can be made of nickel and gold plated for soldering the case to the package wall.

Seventh, other shapes of the MRB can be used in alternative embodiments. For instance, the shape of the glass inside the metal case can be in a square shape, as well as the metal case can also be in a square shape. In principle, all the combinations are possible.

Eighth, concerning the soldering process, an induction soldering technique can be used, avoiding any mechanical contact between the heating part and the ferrule, which means that there is no mechanical stress induced in the soldering process related to manual operations.

It is apparent to one of ordinary skill in the art that the use of the MRB 100 could be extended to other optical components such as switches, VOAs, or other optical components that employ an optical feedthrough.

Figure 3:
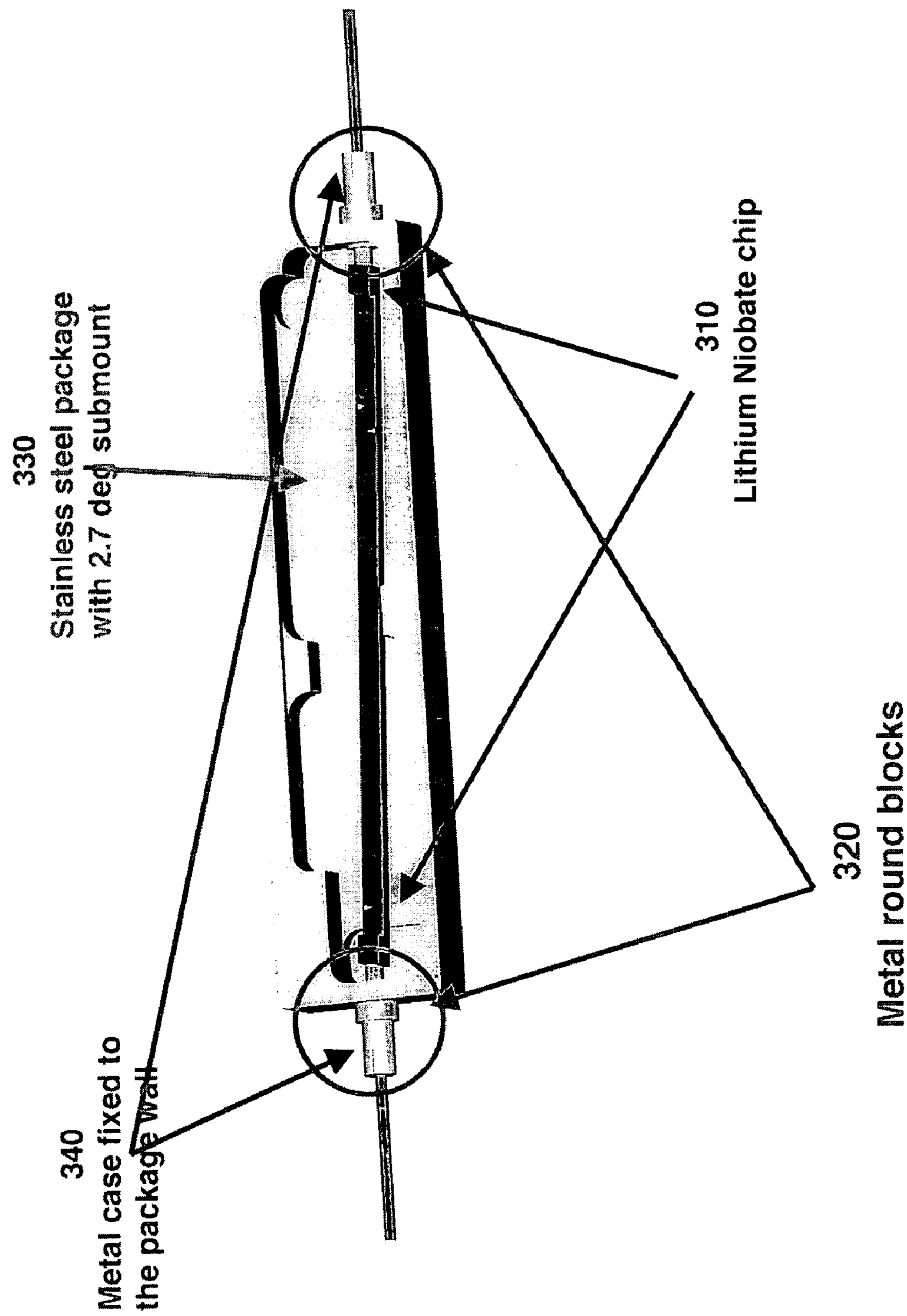
FIG. 3 depicts a structural diagram illustrating a second embodiment of a ultra small form factor LiNbO3 optical modulator in attaching a LiNbO3 chip in accordance with the present invention.
Figure 4:
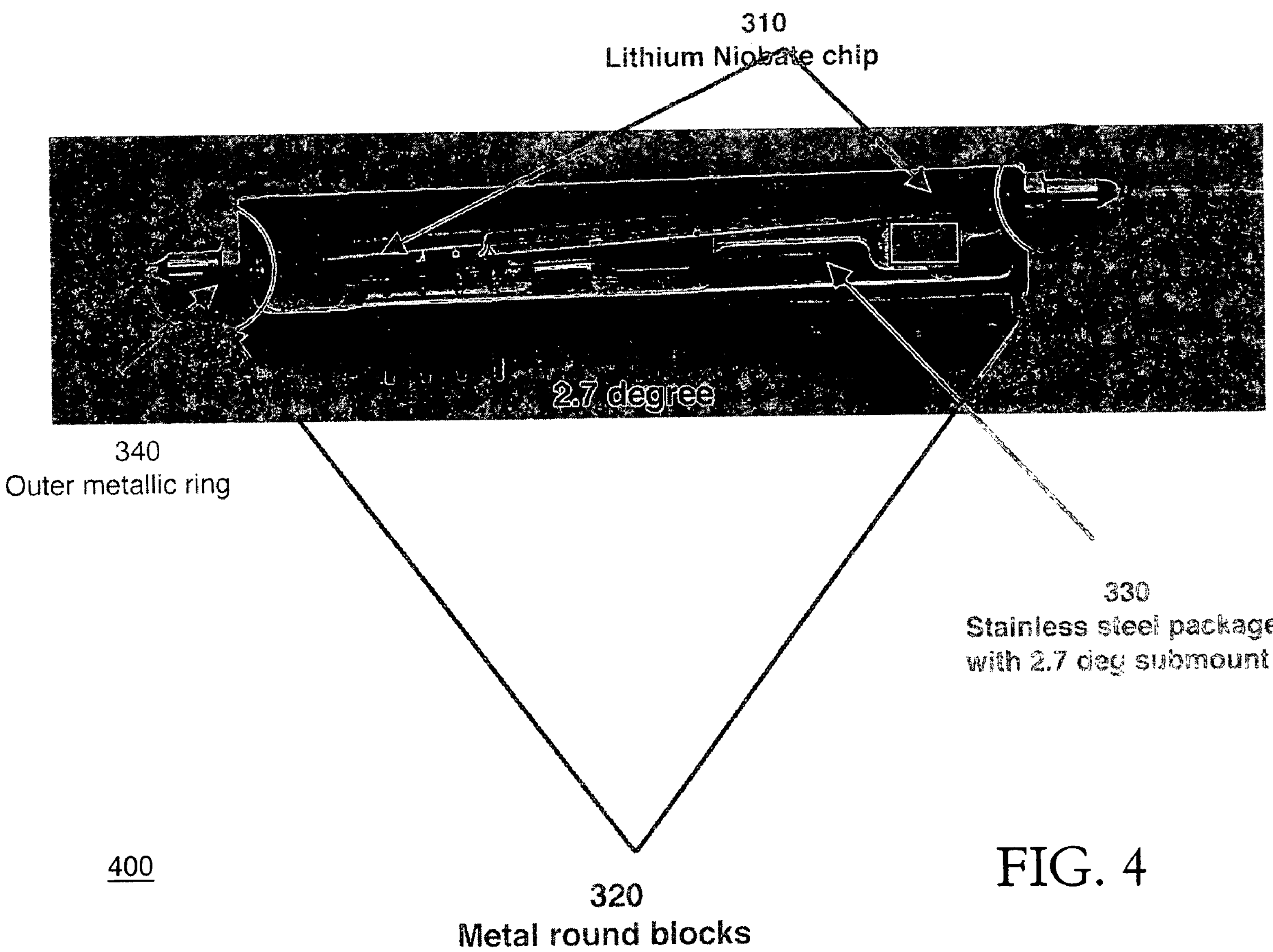
FIG. 4 depicts a flow diagram illustrating the operational in accordance with the present invention.

FIG. 3 depicts a structural diagram illustrating a second embodiment of a ultra small form factor LiNbO3 optical modulator in attaching a LiNbO3 chip for reducing the mechanical stress induced by the different polishing angle of the MRB and the polishing angle of the chip. An actual package of the LiNbO3 optical modulator 300 is shown in FIG. 4. In order to avoid unwanted back-reflection at the chip/pigtailing interface and according to the Fresnel law, the two surfaces exhibit a different polished angle. In one type process, the face of a LiNbO3 chip 310 is 6 degree polished, and a metal round block (or glass block) 320 has 8.7 degree of angle, so the relative angle, once attached the two surfaces is 2.7 degree. Considering a standard process, with the fiber, this angle is compensated by the flexibility of the fiber and the optical feedthrough can exit the package wall perpendicularly (see FIG. 6). In this case, a metallic ring is placed on the outer package wall to support the optical feedthrough, for soldering the parts, and finally acts as a support for standard rubber boot. Concerning the rigid structure proposed, this angle is maintained also out of a package 330, and a metal case 340 of the MRB 320 exits at an angle different for 90 degree out the hole in the package 330. However, this configuration presents a challenge for enclosing in a package wall an outer ring that can house an angled feedthrough.

To solve this issue, a configuration with the die-attach is used. Since the relative angle in one type of modulator is 2.7 degree, the objective is to create a housing in the package 330 for the chip 310 with the inclination of 2.7 degree. The chip 310 is attached in to the package 330 by means of thermal resin or double-coated tape with the relative inclination. The MRB 320 is perpendicular to the package wall, and moreover all the pigtailing process are simpler. Then, the presence of an outer metallic ring helps during the soldering, as well as placing the rubber boot housing.

The aperture in the housing wall is adapted to mounting the ferrule in a plane that is perpendicular to the package wall. That translates to a desirable amount of mechanical stress reduction as well as a simpler boot design. The ferrule is then fixed to the package wall by means of thermal resin or solder alloy. In addition, an induction heating equipment can be advantageously employed.

It is apparent to one of ordinary skill in the art that the use of different combination of polished angled could be extended.

Figure 5:
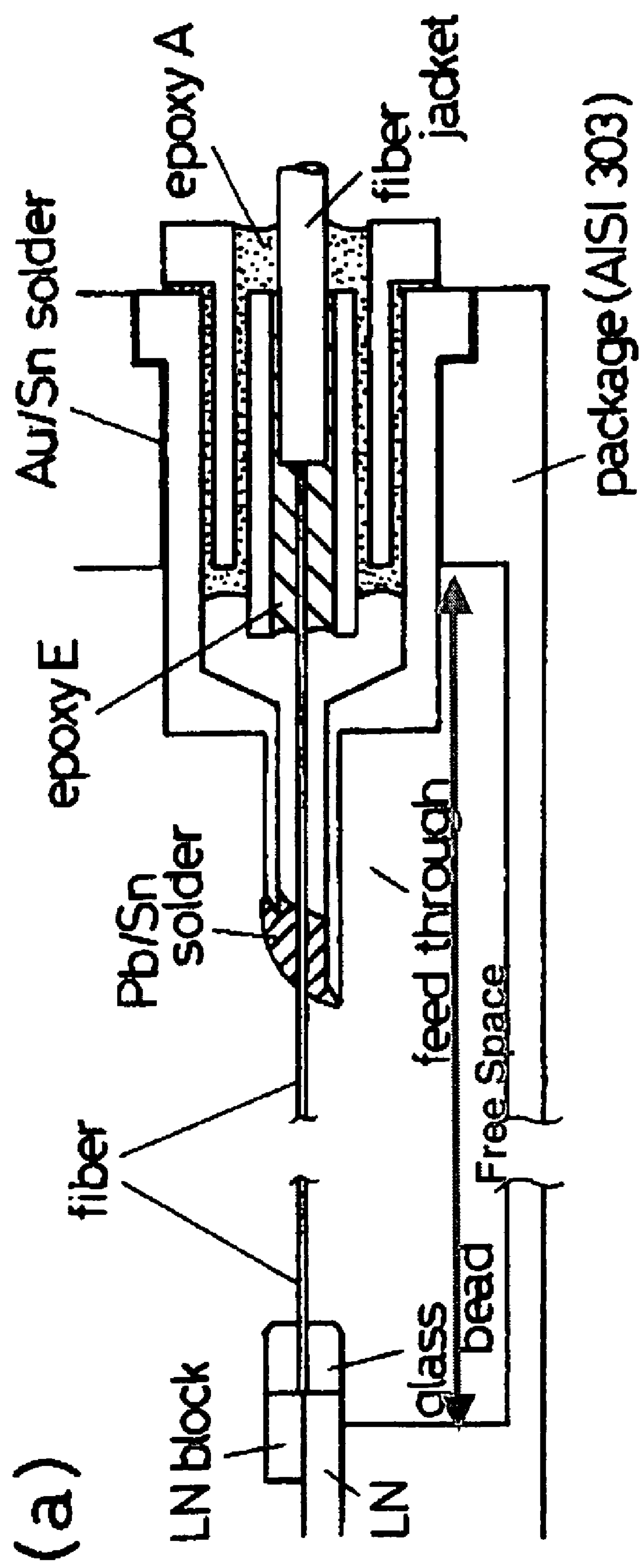
FIG. 5 depicts a schematic diagram illustrating a standard LiNbO3 optical modulator package in accordance with the present invention.
Figure 6:
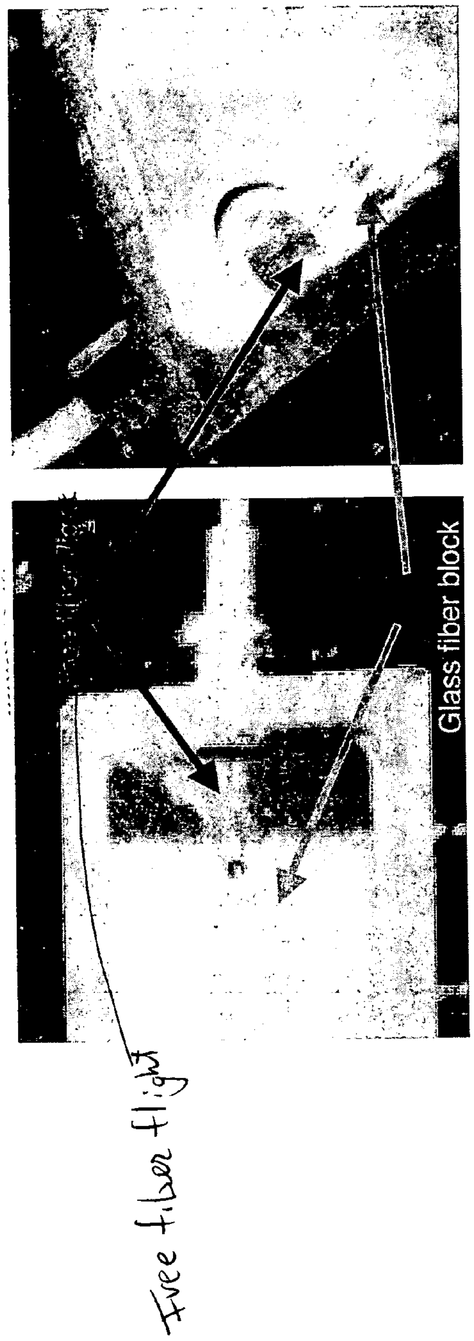
FIG. 6 depicts a pictorial diagram illustrating an actual small form factor modulator package in accordance with the present invention.

Additional illustrations of a LiNbO3 optical modulator package are shown in FIGS. 5 and 6. FIG. 5 depicts a schematic section of a standard LiNbO3 optical modulator package, and an actual small form factor modulator package is shown in FIG. 6.

The housing used for this device is derived from classic microwave electronic packages. The package interior is machined to form positions for the internal electronic components. Pockets are placed to position a lithium niobate die and several ceramic substrates, which act as microwave input and termination. A hermetic microwave feedthrough is inserted for electrical access. Metallic tubes are brazed into ports in the housing which are used for optical feedthroughs. The package surface is plated with nickel covered with gold. For the packaging house materials, the choice traditionally is between stainless steel and Kovar. While stainless steel provides a good thermal expansion match to the lithium niobate, Kovar is selected as the housing material as it provides a good thermal expansion match for optical fibers, standard glass-to-metal seals and ceramic feedthroughs. Although not all of these are included into the present design, the material system provides room to grow using standard commercially available platforms.

Optical feedthroughs are designed to be modular in that they are manufactured as fully characterized hermetic or non-hermetic sub-assemblies. One seal tube design is used for both a standard single mode fiber and a polarization maintaining fiber, PMF. A loose tube polyester (Hytrel) jacket of 0.9 mm outer diameter is slipped over the fiber length exterior to the hermetic seal and bonded to the seal tube with epoxy and a mechanical crimp. It acts to protect the coated optical fibers during handling and device installation. The seal tube design, solder selection and solder process are developed to ensure low radial stresses would be experienced by the PMF.

A glass tube or fiber square block is applied to the fiber facet. The fiber is attached into the tube using, for example, a commercially available epoxy or UV resin. In the case of the PMF, the polarization axes are rotationally aligned to a feature on the tube. The tube facet is polished to a specific angle found to reduce internal reflections (typical angles span from 6 to 9 degree). The fibers entering and exiting the package are then aligned and fixed to the LiNbO3 chip and sealed to the package wall with solder techniques. The sealing of the optical fiber usually requires may involve certain processes in particular when a polarization maintaining fiber is used. During the optical alignment and attaching process, the glass tube is held and manipulated relative to the LiNbO3 die until it is attached to the die facet. After the pigtailing process the optical feedthrough could be fixed to the package wall by means of solder or epoxy resin. The assembly made by the fiber block, the fiber and the metal feedthrough is packaged as an optical fiber assembly. The optical fiber assembly, the lithium niobate die, and the housing make up the three primary parts in an optical modulator package.

A LiNbO3 die exhibits different thermal expansion coefficients (CTE) with respect to the different crystallographic axes. In one application, the chip may employ an X-cut LiNbO3 die in which the X and Y axes have aCTE of about 14 ppm, whereas for Z axis the GTE is about 7 ppm. For the other materials used for the modulator package, the following provides one example:

package material: Stainless steel—18 ppm

Glass tube or bored block—range from 0.5 up to 7 ppm

Fiber glass—0.5 ppm

Feedthrough tube: Stainless steel—18 ppm

Resin to fix the glass tube to the LiNbO3 facet: LW epoxy—>100 ppm

Resin to fix the fiber inside the Feedthrough tube: thermal resin—>100 ppm

Resin (double coated tape) to attach the chip to the package substrate: thermoplastic resin—>100 ppm A particular technique may be used in order to induce thermal stress for the entire modulator structure. Every thermal or mechanical stress could compromise the performance and the reliability of the modulator.

The term free space means the whole space between the chip and the package wall. The free space comprises a glass fiber block (bored block or ferrule), a portion of fiber, and in some cases also part of the feedthrough tube (see FIG. 5). In a conventional modulator, this fiber free space can be in order of 20 mm. In the present invention of a small form factor package, the free space has been reduced to less than 1 mm. If each side of the package has this free space, in order to reduce the overall package dimension, different solutions have to be improved for the managing this free space. The present invention reduces the minimum of this unused space inside the package on two fronts: the first regards the chip position inside the package (and the relative attaching process) and the second is a novel design for the optical fiber assembly. All these solutions have been studied in order to reduce and to minimize the mechanical and thermal stress induced by the realization process and by the different thermal expansion coefficients, also to provide a reliable optical modulator.

Those skilled in the art can now appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications, whether explicitly provided for by the specification or implied by the specification, will become apparent to the skilled practitioner upon a study of the drawings, specification, and following claims.

We claim:

1. A packaging structure of an ultra small form factor lithium niobate optical modulator, comprising:

a metal round block having two parts, an inner part that is made of a first type of material and an outer part that is made of a second type of material that comprises stainless steel, the inner and outer parts being held together by a resin or inserted, the metal round block having a first end and a second end, wherein the second type of material is different from the first type of material and the inner part has a polished angled face of 8 degrees;

an optical round ferrule attaching to the first end of the metal round block; and a fiber attaching to the second end of the metal round block.

2. The packaging structure of claim 1, further comprising a fiber overcable for placing the fiber inside the fiber overcable that attached to the second end of the metal round block.

3. The packaging structure of claim 1, wherein the first type of material comprises zirconia.

4. The packaging structure of claim 1, wherein the first type of material comprises borosilicate BK7.

5. The packaging structure of claim 1, wherein the first type of material comprises Pyrex.

6. The packaging structure of claim 1, wherein the fiber comprises a polarization maintaining fiber.

7. The packaging structure of claim 1, wherein the fiber comprises a single mode fiber.

8. A packaging structure for attaching a lithium niobate chip in an ultra small form factor optical modulator, comprising:

a lithium niobate chip that has P degree polished;

a block means that is tilted at Q degree of angle, wherein the attachment of the lithium niobate chip to the block means produces a R degree by subtracting the Q degree from the P degree; and a metal ring operatively attached to a first end of the block means for supporting a rubber boot.

9. The packaging structure of claim 8, wherein the block means comprises a metal round block.

10. The packaging structure of claim 8, wherein the block means comprises a glass block.

11. The packaging structure of claim 8, further comprising a stainless steel package with a P degree submount for attaching the lithium niobate chip to the stainless steel package.

12. The packaging structure of claim 11, wherein the lithium niobate chip is attached to the stainless steel package by means of thermal resin.

13. The packaging structure of claim 11, wherein the lithium niobate chip is attached to the stainless steel package by means of double-coated tape.

14. The packaging structure of claim 8, wherein the Q degree is 8.7.

15. The packaging structure of claim 14, wherein the R degree is 2.7.

16. A packaging structure for attaching a lithium niobate chip in an ultra small form factor optical modulator, comprising:

a lithium niobate chip that has a P degree polished, wherein the P degree is 6; and a block means that is tilted at a Q degree of angle, wherein the Q degree is 8.7;

wherein the attachment of the lithium niobate chip to the block means produces a R degree by subtracting the Q degree from the P degree.

17. The packaging structure of claim 16, wherein the block means comprises a metal round block.

18. The packaging structure of claim 16, wherein the block means comprises a glass block.

19. The packaging structure of claim 16, further comprising a stainless steel package with a submount for attaching the lithium niobate chip to the stainless steel package.

20. The packaging structure of claim 19, wherein the lithium niobate chip is attached to the stainless steel package by means of thermal resin.

* * * * *